Figure 1:
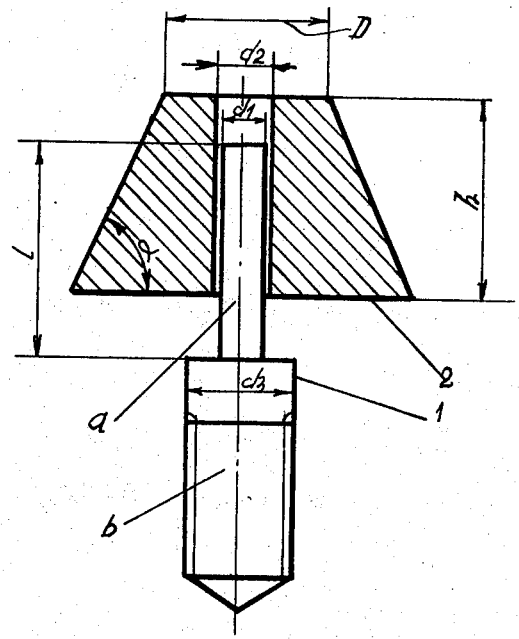

United States Patent
Million et al.

[15] 3,645,130
[45] Feb. 29, 1972

[54] PROCESS TESTPIECE AND DEVICE FOR THE STATIC DETERMINATION OF THE MINIMUM DELAYED CRACKING STRESS OF WELDED STEELS

[72] Inventors: Adolf Million, str. Povernei 15-17; Carol Million, str. Belgsad 12, both of Bucharest, Romania; Iosif Cabelka, str. Mudronova 52, Bratislava, Czechoslovakia

[22] Filed: Apr. 1, 1969

[21] Appl. No.: 843,872

[52] U.S. Cl. .................................73/95, 73/15.6, 73/87, 73/101, 73/103
[51] Int. Cl. ..........................................G01n 3/08
[58] Field of Search..................73/95, 101, 103, 86, 87; 219/127, 128

[56] References Cited

UNITED STATES PATENTS

| | | |
|---|---|---|
| 2,924,969 | 2/1960 | Clough et al............................73/101 |
| 3,471,677 | 10/1969 | Dixon .................................219/127 X |

Primary Examiner—Jerry W. Myracle
Attorney—Karl F. Ross

[57] ABSTRACT

A method of and a system for determining the minimal delayed fissuring strain of welded steels in which a cylindrical steel rod is inserted through a hole in a support to a surface of the latter at the end of the hole opposite that through which the rod is inserted. The welding produces a heat-affected zone in the rod beneath the weld. The rod is loaded and placed under static traction with the specific road (load per unit cross section of the heat-affected zone) in which delayed fissuring occurs being the strain.

4 Claims, 4 Drawing Figures

Adolf MILLION
Carol MILLION
Iosif CABELKA

Inventors.

BY: Karl J. R.

PROCESS TESTPIECE AND DEVICE FOR THE STATIC DETERMINATION OF THE MINIMUM DELAYED CRACKING STRESS OF WELDED STEELS

The invention relates to a static testing process for determining the minimum delayed cracking and fracture stress in the heat affected zone (HAZ) of welded joints, by making use of testpieces of a shape adequate to the purpose, welded and submitted to simple tensile forces, applied directly in the critical sections of the HAZ.

The determination of the minimum delayed cracking and fracture stress of welded steels, in the HAZ of the welds is necessary in order to know to what extent, the mechanical-metallurgical processes, characteristic of the metal welding, influence the resistance properties and the sensitivity to cracking and to brittle fracture of the steels used in metallic structures and in manufacturing all kinds of welded machine components, as well as for establishing the technological conditions, relating to the selection of electrodes, to the preheating temperature, and the heat treatment after welding, which confer upon the welded steel the same characteristics as those nonwelded bodies.

Various procedures are known for estimating the sensitivity of steels to cracking and to brittle fracture during the welding and after it, such as:

tests performed by joining superposed plates by means of corner joints, and determination of the frequency and size of the cracks, by visual checking and by metallographic study of the machine-sectioned welded zones;

impact tests, on testpieces taken from various portions of butt-welded sheets, including the welding seam and the HAZ, the notch in the testpiece being located at various distances from a conventional mark;

cracking and fracture tests on butt-welded sheets, rigidly squeezed in a device preventing the free contraction of the weld during its cooling, the cross section of the seam being less to that of the sheets, by measuring the stress and the time when the first cracks appear and when the seam is completely broken;

bending tests of flat testpieces, on which a welding seam has been deposited, wherein the welded part is submitted to stretching, by measuring the angles at which the total fracture of the testpiece occurs, and by analyzing the appearance of the fracture surface;

cracking tests, with welding seams applied along a cut in a portion of a sheet, remaining rigid on the unwelded portion, and capable of preventing the thermal contraction of the welding seam, so that in case of sensitivity to cracking of the weld or the base metal, the substrate's should be a result of the own contraction stresses;

static tensile tests, with cylindrical, notched testpieces, inserted in a punched sheet, over which a welding seam is laid, the fracture occuring at the level of the notch, under the action of external tensile forces, applied during the welding process, or after the welding;

impact test of welded testpieces, provided with a notch at the level of preestablished cross or longitudinal sections, by determining the depth of the crack, as a function of temperature and of impact intensity;

underbead hardness tests, by applying simple welding seams on flat testpieces, by measuring the hardness variation in the HAZ after sectioning the testpiece, and comparing the results with existing statistical values, which limit the maximum hardness to a certain value, considered as an admissible limit for excluding the appearance of cracks.

The drawback, common to all these testing methods consists in that—while every method enables certain checks to be made upon the behavior of the steel by welding,—none of them is suitable for the quantative determination of the minimum tensile strength, at which the cracking begins in the heat-affected zone of the welds, and none permits precise determination of quality and the state of the electrode, the preheating temperature and the annealing temperature, at which the mechanical properties of the steel in the HAZ reach the initial properties of the unwelded material.

In fact, if one measures the size and the frequency of the cracks arising due to the internal stresses deriving from the welding, one may get information about the crack sensitivity of welding joints, and consequently about the weldability of the base metal. Without however knowing anything regarding the direction and the strength of the internal stresses deriving from welding, from which the cracks initiate, one cannot determine the level of the inner stresses or of the external strains, at which the risk of partial or total fracture begins.

On the other hand the tests based on artificial, crack initiating notches allow measurement of the stress initiating and propagating the crack up to fracture in a weakened section—and thus predestined to fracture, due to the notch itself—excluding thus the possibility of fracture in a more dangerous section, or else measuring the actual cracking and fracture stress in the actual welds, without notches.

The weldability indices of he materials, resulting from any of the above-mentioned methods, may have only a conventional and orientative character, and represent in no case minimum cracking stresses, to be used as a resistance criterion, in view of certainly eliminating the risk of cracking or of brittle fracture during the manufacture or the use of the welded structure.

The present invention removes the drawbacks of the above-mentioned processes, in that—for the purposes of determining the technological conditions, necessary for ensuring to the welded steel a delayed cracking and fracture strength, higher than the ultimate tensile strength of the unwelded base metal—it employs as a criterion the minimum delayed cracking and fracture stress in the HAZ, determined under the concomitant or separate action of internal and external static tensile stresses, applied to a cylindrical, unnotched testpiece, which in a first version has one end, and in a second version both ends rigidly fixed, while the minimum cracking and fracture stress is measured directly along a strictly limited portion of the HAZ, achieved in the conditions of structural changes, plastic deformations and of internal stresses specific to short welding seams, applied in controlled technological conditions, on massive parts.

Figure 2:
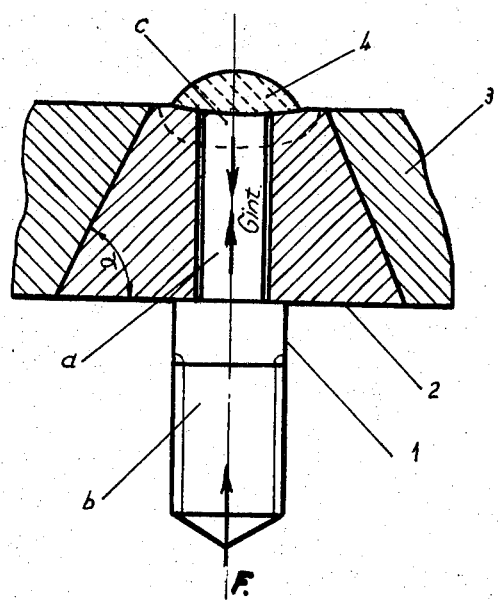
Figure 3:
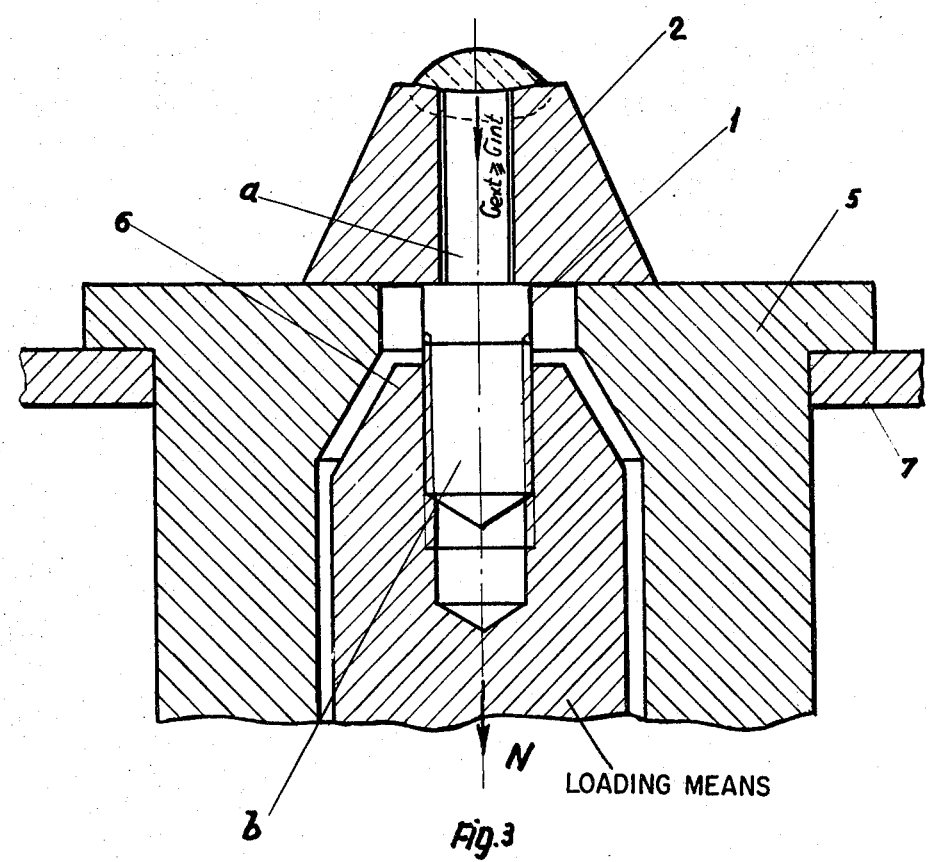
Figure 4:
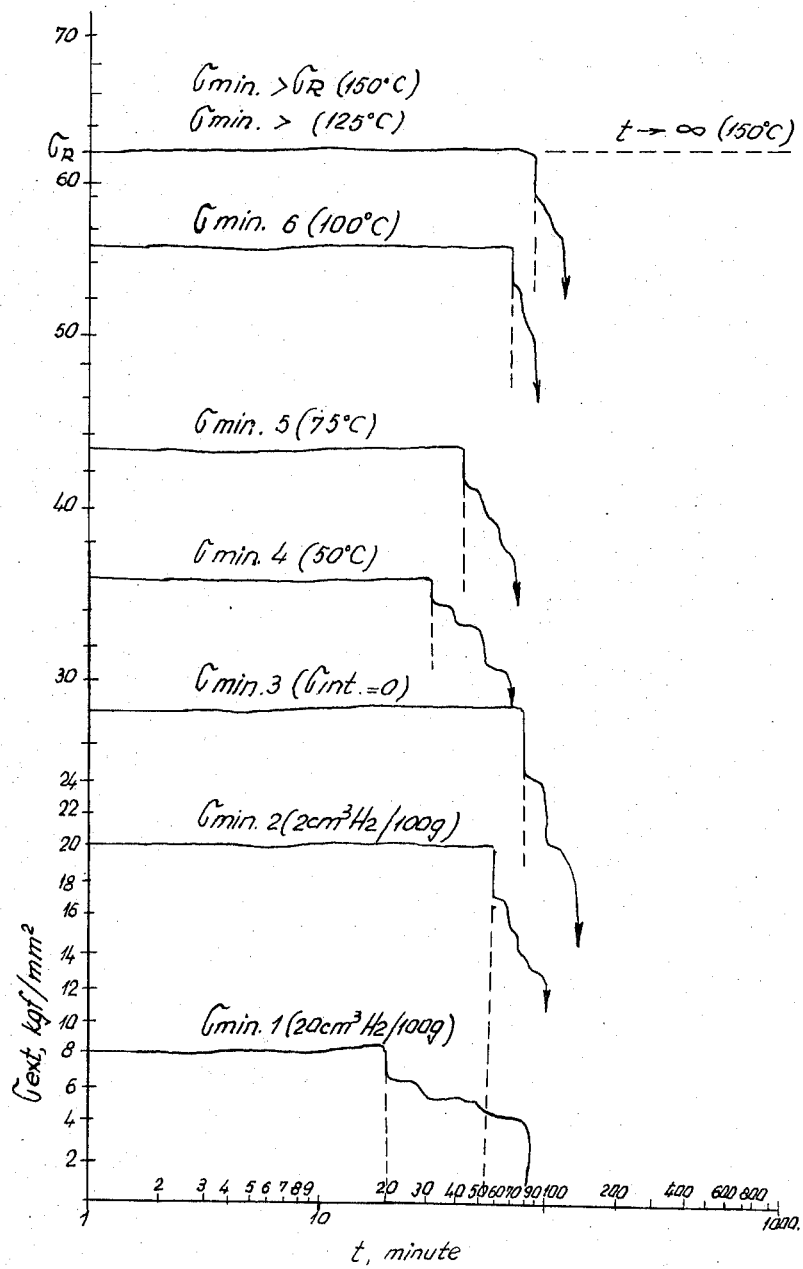

Follows an example of embodiment of the process, in connection with FIGS. 1, 2, 3 and 4, representing:

FIG. 1: an axial section of the testpiece;

FIG. 2: an axial section of the testpiece, fixed rigidly in welding position within the controlled cooling or heating device, FIG. 3: a partial axial section of the tensioning device, together with the welded testpiece, in tensioning position;

FIG. 4: diagram of the minimum delayed cracking and fracture stresses, determined in the above-mentioned example.

The process according to the invention consists in tensioning the testpiece by means of an axial constant force, the testpiece being achieved by machining, and consisting in general of two distinct parts—a cylindrical rod 1 and a frustum-shaped part 2 (out of which only the first one must be made of the material to be tested)—the cylindrical rod 1 having a finely machined and not notched portion, $a$, and a thicker, threaded portion $b$, the main dimensions of both parts being the diameters $d_1$, $d_3$ and length 1 for the rod 1, respectively the height $h$, the diameters $d_2$, D and the base angle $\alpha$ for the frustum-shaped part 2. The tolerances for the diameters $d_1$ and $d_3$ will be so chosen, that the portion $a$ of the rod 1 may be always inserted by gliding, without being pressed and without play in the cylindrical bore of the frustum-shaped part 2.

To determine in the usual conditions the minimum cracking and fracture stress, the length 1 will be taken equal to the height $h$, so that, when inserting the one into the other, the ends of both rod 1 and part 2 should be at the same level (FIG. 2).

The testpiece is inserted, under the influence of an external force F, of constant and of preestablished value, upwardly, into the conical bore of a device 3 for fastening in view of the welding, and which plays at the same time the part of a controlled cooling or heating device. The conical bore of the device 3 must have the same conicity as the frustum-shaped part 2, in order to achieve an intimate contact between both parts and a uniform transmission of heat, from the one to the other. In this situation, a concentric-welding spot 4 is deposited, under controlled welding regime, on the visible face of the testpiece, so that a jointed testpiece is achieved by welding from components 1 and 2, serving for determining the minimum delayed cracking and fracture stress of the steel, in the HAZ $c$ of the cylindrical rod 1.

Diameters $d_1$ and D are so chosen, as—when depositing the welding spot 4 by the applied welding process and regime—to achieve a uniform melting of the testpiece surface, the HAZ being straight and not corrugated, and the isotherms of this zone practically perpendicular to the testpiece axis.

The consequence of the difference in mass between the cylindrical rod 1 and the frustum-shaped part 2, the adjustment $d_2-d_1$ between the boring and the rod, as well as the heating of the testpiece from inside to outward, respectively the cooling from outside to inward, is a more significant heating of the cylindrical rod 1, during the welding, as compared to the frustum-shaped part 2. This brings about a greater thermal dilalation of the cylindrical rod 1 in the direction of the length 1, than that of the frustum-shaped part 2 in the direction $h$, a fact which, during the thermal contraction after welding, produces the appearance of internal (axial) tensile stresses $\sigma_{int}$ of a practically reproducible level, and which—due to their uniform repartition—,play the part of oriented and controllable natural internal welding stresses.

The thermal cycle, to which the testpiece is submitted, due to the welding process, is determined by the energetic welding regime, by the duration of depositing the welding spot 4, by the temperature of the welding device 3 and of the testpiece at the beginning of the welding process, as well as the applied cooling regime; if the welding regime and duration are maintained steady, the thermal cycle in the HAZ $c$ will depend only upon the initial temperature of the device 3 and upon its cooling speed, both being controllably variable, by means of thermal control systems, composed of some known components, as for instance, adjustable electric resistances and usual thermocouples, or else water-cooling circuits with copper chills.

The welding spot 4 is deposited by any welding process, with the desired welding addition and with the beforehand established welding regime, the duration of the welding step being determined by the correct ratio between the weight of the welding spot and that of the testpiece. After the welding, the testpiece may be submitted additionally to a heat treatment, either in the welding device 3 itself, or in a separate furnace.

When the temperature is permitted to become uniform in the whole testpiece, respectively when it has cooled down to the room temperature—or even to a lower or higher temperature—the testpiece is submitted to external stresses, equal or higher than the internal contraction stresses ($\sigma$ext.$\geq\sigma$int.). For this purpose, a special device is employed according to the invention, made of two stressing components, a massive block 5, provided with an axial hole, through which passes coaxially a traction rod 6 of the loading means, whose axial rigidity is calculated as a function of the tensile forces N employed, so that the variation of the tensile stress during the cracking of the testpiece should be discernible. The whole device is mounted inside a working table 7, while the upper part of the massive component 5 is fixed directly to the pane of the table 7. To perform the tensile test of the testpiece, the threaded end $b$ of same is screwed into the threaded hole of the traction rod 6, until the frustum-shaped part 2 of the testpiece is seated freely on the massive block 5 of the tensile device. By means of a known type of drive, based on the principle of the simple machines or of other simple systems for the multiplication of the force, the axial tractive motion of the rod 6 is achieved, reaching the desired external force N, which induces in the cross section of rod 1 of the testpiece an unit stress, evenly distributed ($\sigma$ext.$\geq\sigma$int.), resulting from the division of the tensile force N by the area of the circular cross section of $d_1$ diameter.

Until the unit stresses equal the ultimate tensile strength of the steel tested ($\sigma_r$) measured in the unwelded material, the fracture of the welded testpiece may occur only in the HAZ $c$, because only within this zone, affected by the weld, embrittling processes, specific to the welding, may develop, such as the structural embrittling processes, the thermomechanical ones, or those due to hydrogen in the weld. The effect of these embrittling processes becomes evident by means of delayed cracks and fractures in the underbead zone, respectively in the HAZ in the welded rod 1, which cracks constitute brittle fracture initiations for any welded structure, the external stresses $\sigma$ext.$\leq\sigma$int., maintained for a period, permitting the determination of the minimum values of the tensile stress at which the cracking and the fracture of the steel, influenced by the welding, occurs, by reiterated tests, at progressive values of $\sigma$ext. In case the delayed cracking and fracture occurs under the mere internal action of the own contractive stresses, ($\sigma$ext.$=\sigma$int), it is considered, by approximation, that this unit stress is the minimum cracking and fracture stress, because in a steel, so sensitive to such fracture, i.e., so weak in welded state, the precise determination of these minimum tensile stresses is without practical importance, as the stresses $\sigma_{int}$, deriving from the own contraction of the cylindrical rod 1 are of the order of a few kgf/mm².

The following is an example of the invention as applied to a C–Mn steel destined to be used in a welded structure.

The two parts of the testpiece, namely the rod 1 and the frustum-shaped part 2, were made by turning and grinding of the steel under study, which showed, in unwelded state, a breaking limit of $\sigma_R$=62 kgf/mm², the further technological mechanical characteristics being up to the standard. The steel being supplied in the shape of 20 mm. thick sheet, testpieces have been made use of,—showing the dimensions and the shape according to FIG. 1, with $d_1$=8 mm., D=24 mm., l=h= 20 mm. and $\sigma$=75°. The welding device 3 was made of copper, the initial temperature of the testpiece was 22° C., the clamping force F=600 kg. The welding operation was performed with rutile electrodes of 4 mm. dia, at 150 A. and 22 v. for 10 seconds, the inner axial efforts, resulting as a consequence of the welding operation, being $\sigma_{int}$=8 kgf/mm².

When submitting the testpiece to external stresses $\sigma_{ext}$=8 kgf/mm², the cracking and fracture of the zone of thermal influence occurred according to the diagram in FIG. 4 ($\sigma_{min1}$) which shows that the start of the cracking occurred at 20 minutes after that welding, and the fracture was cooled after 85 minutes. The test consequently demonstrated that, in welding conditions with no preheating, and employing electrodes which, due to the nature of their coating contain relatively high amounts of hydrogen (abt. 20 cm.³/100 g.),—this gas being one of the factors causing brittleness of the welds—the minimum cracking and fracture stress of the welded steel does not exceed 8 kgf/mm². Hence, it was concluded that is is necessary to replace the electrodes tested, by electrodes of a minimum hydrogen contents.

By repeating the test, in conditions otherwise identical, but with basic coated low-hydrogen electrodes (abt. 2 cm³/100 g), the axial internal stresses arising as a consequence of the welding have been the same ($\sigma_{int}$=8 kgf/mm²,) but the cracking and fracture of the HAZ did not occur. In the stretching device according to FIG. 3, with manual drive and mechanical transmission by gear, the testpiece has been submitted to external stresses ($\sigma$ext.) of 10 15 and 20 kgf/mm². The first crack appeared at 20 kgf/mm² after 54 minutes, and the fracture occurred after 93 minutes. It was thus demonstrated, that the minimum cracking and fracture stress of welded steel was—under these circumstances—near the level of 20 kfg/mm² ($\sigma_{min2}$).

Further tests have permitted to check the range of pure structural embrittlement of the material, by removing the thermomechanical action of the internal contractive stresses ($\sigma$int.=O). For this purpose, a test piece has been made use of, of $L>h$ length, inserted in the truncated cone-shaped part 2, so that during the thermal expansion and contraction due to the welding, the rod should be free to contract in axial direction. The testpiece, equally welded with low-hydrogen electrodes, has shown the first crack at $\sigma_{min.3}=28$ kfg/mm², after 76 minutes of strain, and the fracture occurred after 124 minutes. The conclusion was that the tested steel, in welded state, may show cracks even at minimum internal welding stresses, if the external stresses exceed locally the unit effort of 28 kgf/mm². The steel is consequently sensitive to structural embrittlement by rapid cooling, and for this reason, the welding technology of the steel studied must prescribe as a compulsory condition in the preheating before welding.

On basis of the results of the measurements performed without preheating the testpieces examined, similar tests have been carried out with preheating at progressive temperatures.

For this purpose, a welding device 3 has been employed, made of cast iron and provided with an adjustable electric heating circuit, of verifiable temperature. The testpieces are welded with low-hydrogen electrodes, the welding regimes applied being the same as for the tests without preheating. The effects of the several preheating temperatures have been checked, beginning with 50° C. and gradually rising this temperature by steps of 25° C. The tests have been performed after the testpieces have cooled down to the room temperature (22° C.). The tests have shown that for 50° C., the delayed cracking and fracture of the HAZ $c$ begins at $\sigma_{min.4}=36$ kgf/mm²; for 75° C., the cracking and fracture arise beginning with $\sigma_{min.5}=43$ kgf/mm²; for 100° C., with $\sigma_{min.6}=55$ kgf/mm²; for 125° C., with $\sigma_{min.7}=62$ kgf/mm², while at 150° C., the testpiece no longer broke in the HAZ. The information tests performed with electrodes of high-hydrogen contents have shown that, in this case, the delayed fracture of the welded material does not cease, even after a preheating at 150° C., and that in order to achieve a weld deprived of the danger of delayed cracking, it is necessary to preheat up to at least 250° C.

The results reached at in the example of application described has lead to the direct practical conclusion, that in manual welding the steel studied, a positive danger of delayed cracking and fracture of the welds exist, in the shape of cracks in the HAZ. The fundamental factor causing embrittlement in the steel studied consists in the structural chances arising in the HAZ, under the action of the welding thermal cycle, because—when both the hydrogen contents and the internal welding stresses are reduced to a minimum (2 cm.³/100 g. resp. $\sigma_{int.}=0$),—the minimum stress of delayed cracking and fracture is still relatively low ($\sigma_{min.3}=28$ kgf/mm.²$=\sigma_R$).

The appearance of internal stresses as a factor causing embrittlement ($\sigma_{int}=8$ kgf/mm.²) reduces the minimum cracking stress to $\sigma_{min.2}=20$ kgf/mm.², i.e., by 27.5 percent $$\left(\frac{\sigma\ min.3 - \sigma\ min.2}{\sigma\ min.3} \times 100\right)$$

while the presence of hydrogen in the weld may reduce the minimum cracking stress to a very low value ($\sigma_{min.1}=8$ kgf/mm.²$=\Phi^{0.13}\sigma_R$). Neither does the preheating of the material before welding always remove the risk of the appearance of cracks and fractures, because up to preheating temperatures of 125° C., the welding material may suffer delayed crackings and fracture at stresses, equal to, or higher than $\sigma_{min.4}$, respectively $\sigma_{min.5}$, resp. $\sigma_{min.6}$. The example described demonstrates that in making a welded metal structure out of the steel under study, the following basic technological rule should be applied: preheating the material up to at minimum 150° when welding with high-quality, low-hydrogen electrodes, and preheating up to 250° C. when the electrodes are of low quality, with high-hydrogen contents.

Because of the thickened part $b$ of the cylindrical test piece rod 1, one may achieve, not only the rigid blocking of the testpiece, in view of attainment by the contraction of internal stresses $\sigma_{int}$, but an adjustable elastic blocking is also attainable, by inserting for instance a disk spring, permitting to practically increase $\sigma_{int.}$ from $\sigma_{int.}=0$ to $\sigma_{int.}=\sigma_R$

We claim:

1. A method of determining the minimum static stress capable of inducing delayed fissuring of a metal, comprising the steps of forming a generally cylindrical rod of said metal; welding said rod at one end thereof to produce a heat-affected zone lying along the axis of the rod; supporting said rod at said end; and statically loading said rod to an increasing extent to induce delayed fissuring in said heat-affected zone, the load per cross-sectional area of said rod in said heat-affected zone at which delayed fissuring commences, constituting the minimum delayed cracking stress of said metal.

2. The method defined in claim 1, further comprising the step of inserting said rod into a fore formed in a metallic support body to bring said end of said rod flush with a face of said body, said end of said rod being welded to said face with a welded bead lying along the axis of said rod, said rod having a shoulder contracted against said body and spaced from said end upon cooling of the rod, and cooling said rod and said body subsequent to welding and prior to the application of said load to said rod.

3. The method defined in claim 2 wherein said body and said rod are cooled by inserting said body into heat conducting relationship with a complementary support of high-thermal conductivity.

4. An apparatus for testing the minimum delayed cracking stress of a metal using a cylindrical rod composes thereof, said apparatus comprising a frustoconical body provided with a central bore receiving said rod upon insertion thereof into said body in the direction of convergence thereof, whereby an end of said body lies substantially flush with and is welded to the small base of the frustocone; a heat-conductive member having a frustoconical cavity complementarily receiving said body for cooling same; a fixed support bearing upwardly upon the large base of said frustocone for retaining said body against axial movement; and means for statically loading said rod axially against the support.

* * * * *